D. W. BRUNTON.
SIGHT FOR TRANSITS AND SIMILAR INSTRUMENTS.
APPLICATION FILED MAR. 24, 1913.

1,092,822.

Patented Apr. 14, 1914.

WITNESSES

INVENTOR
David W. Brunton
Attorney

UNITED STATES PATENT OFFICE.

DAVID W. BRUNTON, OF DENVER, COLORADO.

SIGHT FOR TRANSITS AND SIMILAR INSTRUMENTS.

1,092,822.  Specification of Letters Patent.  Patented Apr. 14, 1914.

Application filed March 24, 1913. Serial No. 756,416.

*To all whom it may concern:*

Be it known that I, DAVID W. BRUNTON, a citizen of the United States, residing at Denver, in the county of Denver and State of Colorado, have invented a certain new and useful Improvement in Sights for Transits and Similar Instruments, of which the following is a full, clear, and exact description.
This invention relates especially to that type of pocket transits forming the subjects of my Patents No. 526,021, dated September 18, 1894 and No. 1,042,079, dated October 22, 1912, and my application for patent filed August 1, 1912, Serial No. 712,712, later issuing as Patent No. 1,062,582, May 27, 1913, and the object of the invention is to provide peep sights by which a great variety of work may be successfully accomplished especially by geologists and topographers.

Where peep sights are employed, as in the last mentioned patent and application, the sight holes are so small that it is difficult for the user to identify natural objects. It would seem that the obvious remedy would be to enlarge the sight openings, but the difficulty in so doing is to obtain accuracy. I have succeeded in obtaining the larger field of vision with accuracy by using sight holes formed of intersecting or overlapping circular openings arranged preferably side by side and also having their points of intersection in line with a sight-line on a mirror, as I will proceed now to explain and finally claim.

Figure 1:
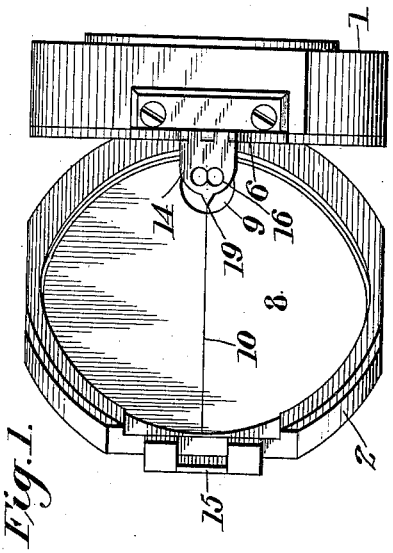
Figure 2:
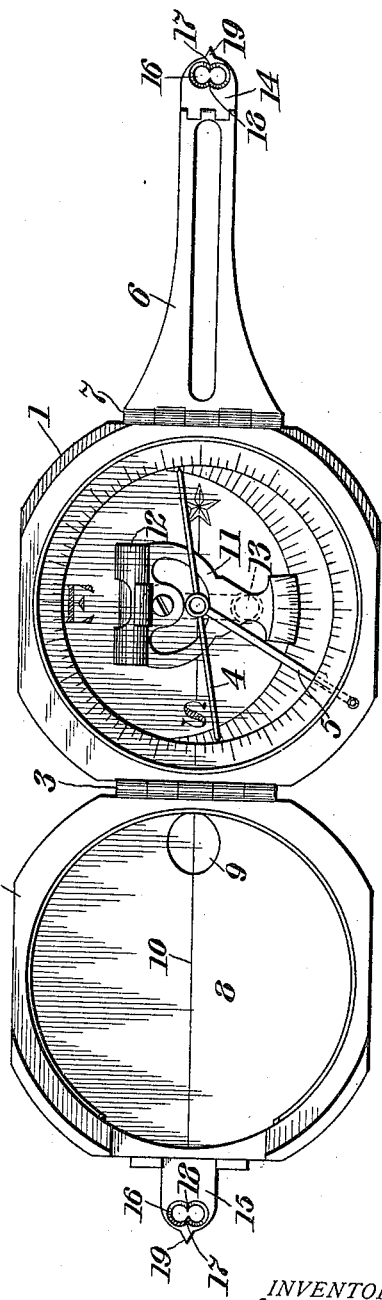
Figure 3:
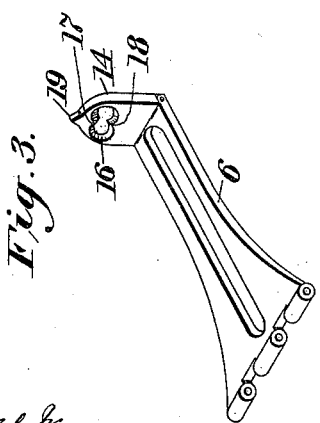

In the accompanying drawings illustrating the invention, in the several figures of which like parts are similarly designated, Figure 1 shows in partial perspective a transit as the operator looks at it in taking vertical angles. Fig. 2 is a plan view of the transit with all the parts opened out in the same plane. Fig. 3 is a perspective view of one of the sights.

The body of the instrument may comprise a casing 1, graduated as desired, and having a lid or cover 2 hinged thereto as at 3. The casing has the magnetic compass needle 4 and the locking lever 5 therefor, substantially as in any of my prior transits referred to, and it also has the longitudinally slotted, adjustable, folding sight arm 6, hinged to the front of the casing as at 7. The cover has the inside mirror 8, and a relatively large opening 9 near the hinge member 3, opposite which hole the mirror is transparent, and the sight-line 10 is extended along the center of the mirror and across this transparent portion of the mirror so as to be exposed through the hole. The casing also contains the combined vernier 11 and bubble-tube 12, and the operating crank-lever or handle 13, which latter is arranged on the outside of the casing so as to be readily accessible to the operator, and shown in Fig. 2 in dotted lines.

In places where there is local magnetic attraction it is sometimes desirable to run tangent lines by back-sighting instead of with the needle, and in order that this may be done, with accuracy, the sights 14 and 15 are applied respectively to the ends of the folding sight 6 and the free edge of the cover 2. These sights are substantially alike and are respectively hinged to their parts so as to be capable of being turned at any desired angle and to be folded down out of the way when the instrument is not in use, or these sights are not required. Each of these sights has its peep hole 16 made up of two overlapping or intersecting circular openings, beveled on the inside and having their intersecting points 17, 18 extending lengthwise of the sight and alining exactly with the center line 10 of the mirror; and from each sight extends the sight point 19. These sights are used in substantially the same manner as the peep-sights on rifles, and being both alike, forward and back sighting may be practised under the same conditions. To provide for any inequalities of the ground surface either the folding sight or the mirror lid may be elevated or depressed, as conditions require.

With instruments of this general character where opposite hair sights are used, fore-sighting but not back-sighting may be conveniently practised, and it is inconvenient if not impossible to take a sight at night or in the dark underground where a candle or artificial light must be used. With my instrument, by turning up the sights, observations may be taken with equal facility either fore or back and in daylight or artificial light. The eye looks through the peep hole and over the rifle sight in front, and sights at objects above or below the horizontal are obtainable by swinging the hinged lid on one side of the instrument or the long sight on the other.

Larger sight openings are desirable to enable a geologist or topographer to identify natural objects. In working out various schemes for obtaining larger sight openings and consequently a larger field of vision, the difficulty of obtaining accuracy has been encountered. By constructing the openings of two overlapping circular holes, with their points 17, 18 alining exactly with the center line 10, and carrying this line across the opening 9, all difficulties of this character are overcome. By holding the instrument so that these points 17, 18 are on the line 10, one may get the exact center line of the sight, and at the same time have a sufficiently wide field of vision to enable him to recognize natural objects, a great desideratum in all kinds of geological, coast and reconnaissance work. The mere provision of a large opening is not in itself adequate in a transit, because accuracy is well-nigh impossible, owing to the difficulty of subdividing the large opening with the line of sight in front; but by using two overlapping circular apertures, their projecting points give the exact center of the combined opening, without materially obscuring the vision, and hence follow the advantages of a large opening and wide field of vision, without in any way interfering with the accuracy of the sight.

What I claim is:

1. A transit, having a peep sight provided with a wide aperture intersected centrally by sight points extending crosswise thereof longitudinally of the sight.

2. A transit, having a peep sight provided with an aperture formed of overlapping circular openings, the intersection of these openings being central of the aperture and forming sight points extending crosswise thereof.

3. A transit, having a peep sight provided with a wide aperture intersected centrally by sight points extending crosswise thereof in the direction of the length of the sight, and a mirror having a transparent portion crossed centrally by a sight line on the mirror with which sight line the sight points aline.

4. A transit, having a casing, a peep sight applied thereto, a cover hinged to the casing and provided with an opening made near its hinge end, a mirror arranged inside of the cover and having a transparent portion opposite said opening, and a sight line extending centrally across the mirror and transparent portion, said peep sight having an aperture composed of overlapping circular openings intersecting centrally with relation to the aperture and alined with the sight line of the mirror, and a similar peep sight on the far edge of the cover which is foldable and adjustable.

In testimony whereof I have hereunto set my hand this 18th day of March, A. D. 1913.

DAVID W. BRUNTON.

Witnesses:
ROBERT K. MCCORMICK,
WILLIAM NEUKUMET.

---

Copies of this patent may be obtained for five cents each, by addressing the "Commissioner of Patents, Washington, D. C."